United States Patent
Grimm et al.

(10) Patent No.: US 8,880,240 B2
(45) Date of Patent: Nov. 4, 2014

(54) METHODS OF CONTROLLING VEHICLE INTERFACES USING DEVICE MOTION AND NEAR FIELD COMMUNICATIONS

(71) Applicant: GM Global Technology Operations LLC, Detroit, MI (US)

(72) Inventors: Donald K. Grimm, Utica, MI (US); Timothy J. Talty, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/680,848

(22) Filed: Nov. 19, 2012

(65) Prior Publication Data

US 2014/0142783 A1    May 22, 2014

(51) Int. Cl.
*H04W 4/04* (2009.01)
*G06F 17/00* (2006.01)
*H04W 4/00* (2009.01)

(52) U.S. Cl.
CPC .............. *H04W 4/046* (2013.01); *G06F 17/00* (2013.01); *H04W 4/008* (2013.01)
USPC ................. 701/2; 455/41.1; 455/99

(58) Field of Classification Search
CPC ... H04W 4/046; G06F 17/00; G06K 19/0723; G07C 5/008
USPC ........... 701/1, 2, 36, 49, 45, 41, 48, 117, 120; 340/5.1, 5.8, 3.1, 426.13, 426.16, 340/426.17; 455/420, 41.1, 41.2, 569.2, 99
See application file for complete search history.

(56) References Cited

U.S. PATENT DOCUMENTS

| | | |
|---|---|---|
| 8,117,445 B2 | 2/2012 | Werner |
| 8,195,106 B2 | 6/2012 | Jung |

(Continued)

FOREIGN PATENT DOCUMENTS

| | | |
|---|---|---|
| CN | 102377794 A | 3/2012 |
| EP | 2 364 006 A1 | 9/2011 |
| EP | 2 410 721 A1 | 1/2012 |

OTHER PUBLICATIONS

Bowers, Mike, "NFC SmartPhone to replace car keys" website: http://www.cellular-solutions.co.uk/blog/nfc-smartphone-replace-car-keys/, Jan. 17, 2012.

Clark, Sarah, "NXP and Continental demonstrate concept car with embedded NFC" website: http://www.nfcworld.com/2011/02/15/36033/nxp-and-continental-demonstrate-concept-car-with-embedded-nfc/ Feb. 15, 2011.

Planck, Seth, "Continental Shows Off NFC Car Keys" website: http://www.nfcrumors.com/10-03-2011/continental-shows-off-nfc-car-keys/ Oct. 3, 2011.

(Continued)

*Primary Examiner* — Mary Cheung
*Assistant Examiner* — Rodney Butler
(74) *Attorney, Agent, or Firm* — John A. Miller; Miller IP Group, PLC

(57) ABSTRACT

Methods for establishing continuous communications between a vehicle and a mobile device using Near Field Communications (NFC), and using the NFC communication to enable application hosting on the mobile device and other features. An NFC-enabled mobile device is placed in close proximity to an NFC antenna in the vehicle, where in one embodiment the NFC antenna is integrated into a wireless charging pad for the device. Continuous wireless NFC communications are established between the mobile device and the vehicle, such that the device can serve as a controller for in-vehicle systems. Control applications on the mobile device can include driver-commanded features such as operation of windows and door locks, as well as automatic features such as navigation and collision warning. Other uses of the NFC-enabled mobile device are also disclosed, such as event-based information capture and gesture-based control.

18 Claims, 6 Drawing Sheets

(56) References Cited

U.S. PATENT DOCUMENTS

| | | | |
|---|---|---|---|
| 8,347,014 B2 * | 1/2013 | Schubert et al. | 710/305 |
| 2009/0177530 A1 | 7/2009 | King | |
| 2011/0060480 A1 * | 3/2011 | Mottla et al. | 701/2 |
| 2011/0086678 A1 * | 4/2011 | Suzuki | 455/569.2 |
| 2011/0137773 A1 | 6/2011 | Davis, III | |
| 2011/0202393 A1 | 8/2011 | DeWakar | |
| 2011/0210830 A1 * | 9/2011 | Talty et al. | 340/10.51 |
| 2011/0212688 A1 | 9/2011 | Griffin | |
| 2011/0248831 A1 | 10/2011 | Bloebaum | |
| 2011/0319018 A1 * | 12/2011 | Kroman | 455/41.1 |
| 2012/0208458 A1 * | 8/2012 | Iwasaki et al. | 455/41.1 |
| 2012/0214418 A1 * | 8/2012 | Lee et al. | 455/41.2 |
| 2012/0253552 A1 * | 10/2012 | Skelton | 701/2 |
| 2013/0324056 A1 * | 12/2013 | Maguire | 455/73 |

OTHER PUBLICATIONS

Clark, Mike, "Delphi NFC key fobs enable drivers to access vehicle data from their smart phones" website: http://nfcworld.com/2010/10/01/34516/delphi-nfc-key-fobs-enable-drivers-to-access-vehicle-data-from-their-smart-phones/ Oct. 1, 2010.

Burghardt, Benjamin, "Near Field Communication" website: http://www.dod.com/crossovers/technical/835ae.htm, 2010.

Rainer, Steffen, "Near Field Communication (NFC) in an Automotive Environment" website: http://ieeexplore.ieee.org/application/mdlconfirmation.isp?arnumber=05476471&icp=false, 2010.

Deutsche Telekom, "Intelligent car key in a cell phone" website: http://www.telekom.com/innovation/connectedcar/81840, Aug. 1, 2012.

* cited by examiner

METHODS OF CONTROLLING VEHICLE INTERFACES USING DEVICE MOTION AND NEAR FIELD COMMUNICATIONS

BACKGROUND OF THE INVENTION

1. Field of the Invention

This invention relates generally to establishing a continuous communication session between a mobile device and a vehicle using Near Field Communications (NFC) and, more particularly, to a method for establishing a continuous communication session between a mobile device and a vehicle using NFC in which the mobile device can host applications in lieu of a vehicle controller, the device can be used to permit or restrict certain vehicle functions, and data can be continuously or intermittently transferred from the device to the vehicle and vice versa.

2. Discussion of the Related Art

Wireless communication systems have become increasingly common in modern vehicles, enabling customer mobile devices to interact with vehicles in a variety of ways. Among the wireless technologies, Near Field Communications (NFC) provides inherently strong security by virtue of its very short wireless transmission range. Whereas Bluetooth and Wi-Fi signals travel well outside the confines of a host vehicle and are therefore susceptible to eavesdropping and more serious malicious attacks, the same is not true for NFC. NFC signal range is only 2-4 centimeters, thus making it infeasible for NFC signals to be intercepted by a device which is not physically located within the host vehicle.

Because of NFC's inherent security, its usage in vehicles may become prevalent. Although vehicle manufacturers have considered a number of features which use NFC to communicate with a customer mobile device, there remains a tremendous amount of untapped potential. In particular, NFC is typically used only for transferring a small amount of data on a one-time basis when two NFC devices are placed in close proximity. By combining the power of modern smart phones and other mobile devices with the security of NFC, and extending the NFC communications between the device and the vehicle to a continuous time session, it is possible to use the mobile device to provide value-added feature content to a vehicle without adding cost to the vehicle itself. It is also possible to simplify vehicles by replacing certain components with a combination of mobile device-based applications and NFC-based motion-detection.

SUMMARY OF THE INVENTION

In accordance with the teachings of the present invention, methods are disclosed for establishing continuous communications between a vehicle and a mobile device using Near Field Communications (NFC), and using the NFC communication to enable application hosting on the mobile device and other features. An NFC-enabled mobile device is placed in close proximity to an NFC antenna in the vehicle, where in one embodiment the NFC antenna is integrated into a wireless charging pad for the device. Continuous wireless NFC communications are established between the mobile device and the vehicle, such that the device can serve as a controller for in-vehicle systems. Control applications on the mobile device can include driver-commanded features such as operation of windows and door locks, as well as automatic features such as navigation and collision warning. Other uses of the NFC-enabled mobile device are also disclosed, such as event-based information capture and gesture-based control.

Additional features of the present invention will become apparent from the following description and appended claims, taken in conjunction with the accompanying drawings.

DETAILED DESCRIPTION OF THE EMBODIMENTS

Figure 1:
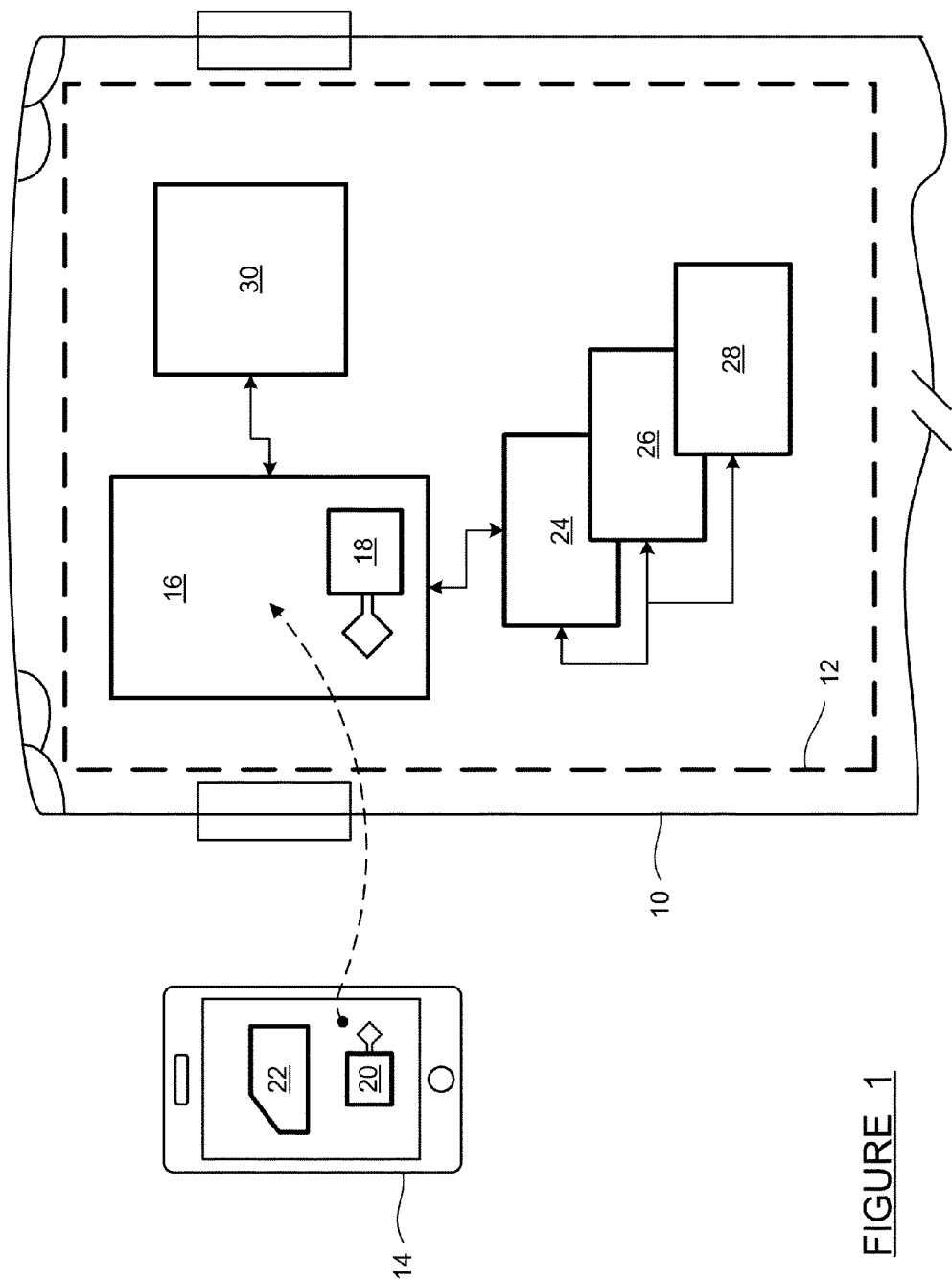
FIG. 1 is a schematic diagram of a vehicle including a system which supports continuous time NFC communications with a mobile device.

The following discussion of the embodiments of the invention directed to methods of controlling vehicle interfaces using device motion and Near Field Communications is merely exemplary in nature, and is in no way intended to limit the invention or its applications or uses.

Smart phones and other modern mobile devices possess computing and communications capability far exceeding the demands of most users. Mobile devices such as smart phones also include touch-screen user interfaces which provide virtually unlimited capability for user interaction with the device. At the same time, the rapid advancement of electronic controls in vehicles, along with the attendant availability of data on information busses, provides unprecedented opportunity for mobile device interactions with a vehicle. Although Wi-Fi and Bluetooth wireless protocols provide ample communications bandwidth to support device-vehicle interaction, the possibility exists that Wi-Fi and Bluetooth signals can be intercepted by a malicious entity outside the vehicle, thus making these wireless technologies suitable only for non-critical communications.

Near Field Communications (NFC) is a wireless communications technology which has become increasingly popular. NFC operates at 13.56 MHz and transfers data at up to 424 Kbits/second. NFC communications can be uni-directional or bi-directional. Communications between two NFC-compatible devices occurs when they are brought within a range of about four centimeters of one another. Thus, a simple wave or touch of an NFC device can establish an NFC connection which can then be used to transfer information of any sort.

An NFC tag is a very small stand-alone device with no power supply or network connectivity. One common type of NFC tag can contain up to 144 bytes of data, which is transferred to an NFC reader when the NFC reader device is passed within close proximity of the NFC tag. Additional memory can be included on a tag depending on the application requirements. NFC tags can be easily placed almost anywhere by including them in simple adhesive-backed paper or plastic stickers. NFC tags can be mounted behind a vehicle surface (as long as there is minimal blockage from metal surfaces) or affixed to the top of a vehicle surface such as the dashboard area or the center of the steering wheel. An NFC reader is a device which uses NFC wireless technology to transfer data from another device such as a tag. An NFC reader has no inherent data size limits, and in fact does not contain its own data; as the name implies, an NFC reader reads data and passes it along to a processor. An NFC transponder or NFC chip is a device which provides two-way data transfer via NFC.

NFC, in contrast to Wi-Fi and Bluetooth, provides for inherently secure wireless communications by virtue of its very short transmission range—typically 1-4 centimeters. However, NFC is traditionally used only for one-time transfer of small amounts of information. By extending NFC capability to support continuous time sessions and ongoing bi-directional data transfer, it is possible to realize the full potential of the mobile device to interact with the vehicle, using a convenient and secure wireless communications channel.

FIG. 1 is a schematic diagram of a vehicle 10 including a system 12 which supports continuous time NFC communications with a mobile device 14. The system 12 includes a device interface module 16, which in one embodiment is a charging pad which wirelessly charges the mobile device 14 when the device 14 is placed on the charging pad (the interface module 16). Including the wireless charging feature into the interface module 16 allows a driver of the vehicle 10 to place his/her device 14 onto the module 16 and leave it there, where it can be used as a full-feature interface to the vehicle and retain a full battery charge for later use outside the vehicle 10.

The interface module 16 includes an NFC chip 18, which has an incorporated NFC antenna. The mobile device 14 also has an NFC chip 20. Thus, when the device 14 is placed on the device interface module 16, NFC communications are established between the device 14 and the interface module 16. The device 14 runs an application 22, which sends data to and/or receives data from the vehicle 10 via the interface module 16. The interface module 16 in turn communicates with other elements of the system 12, including modules 24, 26 and 28. The modules 24-28 are controllers for devices and actuators onboard the vehicle 10 which operate at comparatively low speeds. Examples of the modules 24-28 include controllers for door locks, window lifts, seat actuators and pedal actuators. More than three of the modules 24-28 could be included in the system 12, as any appropriate low-speed control module can be allowed to interface with the mobile device 14 via the interface module 16.

The interface module 16 also communicates with a gateway module 30, which provides access to other low-speed and high-speed system data from the vehicle 10. For example, the gateway module 30 can provide access to infotainment and telematics system data, to enable interaction of the device 14 with the vehicle 10 involving audio, video, phone and other such signals and data. The gateway module 30 can also provide data such as diagnostic trouble codes (DTCs) from an onboard controller to the device 14, and can provide messages and other data from the device 14 to be displayed to the driver of the vehicle 10. These examples will be discussed in detail below.

Using the architecture depicted in FIG. 1, the mobile device 14 effectively becomes a configurable virtual control interface for devices onboard the vehicle 10, as represented by the modules 24-28. For example, the application 22 can provide a touch-screen interface to allow the driver to control vehicle windows, door locks, seats, audio volume, etc. It is easily envisioned that the application 22 could also retain preferences for the owner of the device 14, and these preferences could be employed whenever the device 14 is placed on the interface module 16 to establish NFC communications. Such preferences could include radio station presets, seat and pedal positions, climate control settings and others.

The application 22 could also provide a more sophisticated feature such as collision warning or lane departure warning. If the vehicle 10 is equipped with radar or other object detection systems, and if the vehicle 10 does not include specific collision or lane departure warning software, it is possible to host these features on the device 14 and provide warnings and information to the vehicle's driver. Likewise, if the vehicle 10 is equipped with a short-range communication transceiver (e.g., Dedicated Short Range Communications, Wi-Fi, or other peer-to-peer networking technologies) that is operating in transmit-only mode, it is possible to augment this system using the device 14 and enable a variety of driver warning and information features. Additionally, if the vehicle 10 is equipped with a short range communication transceiver and running a subset of potential warning and information features, additional features can be enabled using the device 14 and the described interface. Hosting the advanced features in the application 22 on the mobile device 14 offers at least two distinct advantages. First, the cost of the vehicle 10 can be lower because the vehicle 10 does not need to provide computing hardware (the processing, memory and storage required by the feature) and software for the feature which is hosted on the device 14. Second, application development and deployment is a well-established and rapid process on smart phones such as the device 14, thus enabling new applications and features to be developed and deployed by a variety of sources throughout the lifecycle of the vehicle 10.

The traditional method of device interaction using NFC, where a one-time exchange of data occurs when two devices are brought into proximity, is clearly insufficient to support the features of the system 12 described above. These features, including using the mobile device 14 as a user interface to vehicle systems, and hosting applications on the device 14 to provide information and control features to the vehicle 10, can only be realized if the NFC exchanges between the mobile device 14 and the interface module 16 are extended to a continuous time session.

Figure 2:
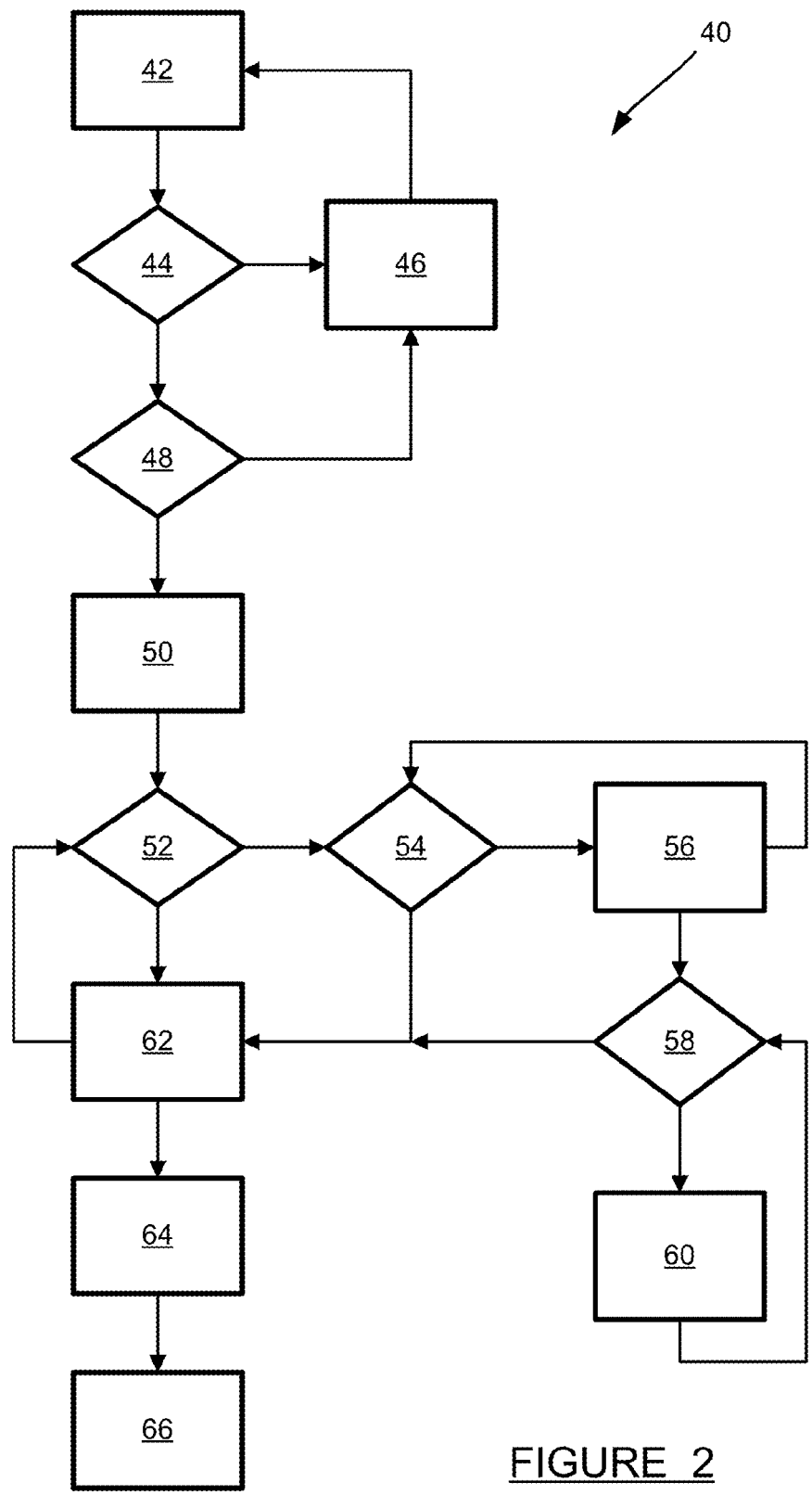
FIG. 2 is a flowchart diagram of a method for establishing and maintaining a continuous time communications session between the vehicle and the mobile device via NFC.

FIG. 2 is a flowchart diagram 40 of a method for establishing and maintaining a continuous time communications session between the vehicle 10 and the mobile device 14 via NFC. The process begins at box 42 with no network communications between the vehicle 10 and the device 14, and any feature applications on the device 14, such as the application 22, are asleep or not running. At decision diamond 44, the vehicle 10—specifically the interface module 16—detects the presence of an NFC-enabled device—in this case, the device 14. If no NFC-enabled device is detected at the decision diamond 44, all network services are disabled by the interface module 16 at box 46, and the process returns to the box 42 with no NFC network connection. If an NFC-enabled device is present at the decision diamond 44, then at decision diamond 48 a determination is made whether the NFC-enabled device is authorized to communicate with the vehicle 10. Authorization could mean that the application 22 is present on the device 14 and was legitimately purchased, or it could mean that the device 14 has been registered as a master or guest mobile device for the particular vehicle 10, or a combination of both. The registration process could include an authentication process outside the vehicle where once the vehicle pairing has occurred, a subsequent authorization request is made to a call center or enterprise portal before vehicle access and control is granted. Such remote authorization and revocation could be used to prohibit unauthorized vehicle usage (e.g., if the customer phone has been stolen), enable other parties (e.g., family or friends) to use the vehicle or enable authorities to remotely access or disable services on a stolen vehicle. The authorization check at the decision diamond 48 is meant to preclude an unrecognized and/or unauthorized device from establishing NFC communications with the vehicle 10. If an unauthorized device is detected at the decision diamond 48, network services are disabled at the box 46.

If an authorized device is detected at the decision diamond 48, network services are enabled at box 50. That is, two-way NFC communications are established between the mobile device 14 and the vehicle 10 via the interface module 16. In order to maintain an ongoing, continuous time communications session between the device 14 and the vehicle 10, it is necessary to periodically test the NFC communications channel and the status of the device 14. These tests are carried out at decision diamonds 52 and 54. At the decision diamond 52, it is determined whether an authorized NFC-enabled device, such as the mobile device 14, is still present on the interface module 16. The presence test could be in the form of a Packet Delivery Ratio (PDR) test, where the PDR must exceed a certain threshold in order to signify device presence. If the device presence test is passed at the decision diamond 52, then at decision diamond 54 a performance challenge is issued to the device 14 by the system 12. The performance challenge could be a small computing task or communications task, which is intended to ensure that the device 14 is responsive and able to perform as a vehicle-attached device. Such a performance challenge will be an ongoing requirement to maintain vehicle access and the nature of the challenge will vary in a random fashion to prevent applications from avoiding the performance test.

If the performance challenge is passed at the decision diamond 54, then vehicle services are enabled for the device 14 at box 56. At the box 56, warning-type services are configured and/or provided. Warning-type services are those services provided by the mobile device 14 to the vehicle 10 which involve informational displays and audio/visual warnings, but do not involve control of vehicle functions. At the box 56, the warning-type services can be configured—for example, by defining what type of warning (audio tone, flashing indicator, etc.) is to be issued for each type of alert provided by the device 14. Also at the box 56, the warning-type services are provided—for example, if the device 14 hosts a driver attentiveness application and the application detects driver drowsiness, a combination of audio and haptic warnings could be issued to the driver of the vehicle 10.

If access to control-type services is also to be provided to the mobile device 14, then at decision diamond 58 a second, more stringent performance challenge can be issued. If the performance challenge at the decision diamond 58 is passed, then at box 60, control-type services are configured and/or provided. Control-type services are those services provided by the device 14 to the vehicle 10 which involve actual control of vehicle functions. For example, if the device 14 hosts an adaptive cruise control (ACC) application, and the device 14 determines through vehicle-to-vehicle (V2V) communications that the vehicle 10 is getting too close to a vehicle in front of it, then the device 14 could issue a command to the vehicle 10 to slow down. The device 14 could similarly host a lane keeping application or many other types of real-time control applications, using V2V, V2I and other data sources.

Separation of the warning-type services at the box 56 from the control-type services at the box 60 allows the two types of services to be configured differently, or for warning-type services to be enabled while control-type services are disabled. Additionally, the two different service types may have different performance criteria. Thus, the performance challenges at the decision diamond 58 may be more difficult and/or more frequent then the performance challenges at the decision diamond 54.

If the PDR does not exceed the threshold at the decision diamond 52, or if the performance challenge is not passed at the decision diamonds 54 or 58, then the process moves to box 62 where a brief wait is carried out before the process returns to the decision diamond 52 where the device presence test is re-tried. After a certain number of wait cycles at the box 62, or a certain amount of total elapsed time, the NFC communications session times out, and network services are disabled at box 64. At box 66, both the system 12 and the device 14 are returned to the state they were in when the process began at the box 42—that is, NFC communications are deactivated by the system 12, and the application(s) 22 on the device 14 are asleep or not running. This condition would be communicated to the driver in some form (audio/visual/haptic) to indicate that the requested feature or service is not available due to device capabilities, due to the device 14 being out of position of the NFC reader or due to the device 14 being outside of NFC communication range (i.e., customer picked up device). In the case where the customer picks up the device 14, the system 12 may fall back on a secondary communication channel (e.g., Bluetooth or Wi-Fi) until the device 14 is replaced to the charging pad (the interface module 16). A reminder may be displayed to the driver while the system 12 is running in this state that the device 14 should be restored to the pad location for optimal performance, security and safety.

Many examples of applications running on the device 14 and providing services to the vehicle 10 via a continuous NFC communications session can be envisioned. One example is the use of the device 14 as a control interface for many different driver-controlled components and features of the vehicle 10—such as seat position, window opening and closing, door locks, HVAC controls, radio controls, etc. These features can all be accessed via a touch-screen interface on the device 14. The features could also be accessed via voice command on the device 14, such as a command for "driver's window up halfway". Because most modern smart phones support voice commands, the application 22 on the device 14 could easily convert the voice commands to control signals which are provided to the vehicle 10 via the NFC interface. This illustrates a particular advantage to using the device 14 as an interface to the vehicle 10—the ability to provide a value-added feature to the driver by taking advantage of existing capability in the device 14, and avoiding adding the cost of a voice recognition system to the vehicle 10.

More advanced applications are also possible, including applications which gather real-time information from a variety of sources and provide signals to the vehicle 10 for information or warning-type services or control-type services, such as the adaptive cruise control and lane keeping applications discussed above. furthermore, as the percentage of vehicles carrying smart phones increases, many types of crowd-sourced data applications become much more robust. Such applications can provide warnings of slow traffic ahead, alternate route navigation assistance, and many other features. These types of innovative and highly functional applications will develop organically in the smart phone market, thus allowing the mobile device 14 to provide many new features and services to the vehicle 10, even if the vehicle 10 is several years old and the features were not envisioned when the vehicle 10 was developed. The system 12 enables this functionality by taking advantage of the inherent security of wireless communications via NFC, and extending the NFC communications to a continuous time session.

The continuous NFC session management algorithm described above enables the mobile device 14 to serve as a user interface device for vehicle systems, and also to host applications which provide additional features to the vehicle 10. Many other use cases are also enabled by the algorithm, made possible by the continuous time communications and by the security inherent in NFC's short signal range.

One such use case is for vehicle mobilization and immobilization—that is, using the device 14 as a sort of "digital key" for vehicle access and usage permissions. The presence of the device 14 on the interface device 16 can become a metaphor for a physical key in the ignition of the vehicle 10. In other words, the vehicle 10 won't run unless a properly authorized device 14 is placed on the interface device 16 and the device 14 passes its credentials along to the vehicle 10.

With the device 14 serving as a digital key for the vehicle 10, many other features can also be provided. For example, a master or owner device serving as the device 14 may provide unrestricted capability in the vehicle 10. However, a guest device serving as the device 14 may have restrictions placed on the vehicle 10, such as geo-fencing (limiting the geographic area that the vehicle 10 can operate within), speed and performance settings (such as maximum speed, maximum acceleration, etc.) and other limits (such as no phone calls or texting from the device 14). The guest device concept can be applied to a child, other family member or friend of the vehicle owner, or guest device permissions can be provided on an as-needed, real-time basis by way of a ride sharing service.

In the case of a ride sharing service, for example, a customer may use her smart phone to rent a vehicle "in downtown Ann Arbor, Mich., from 6:00-10:00 pm tonight". The ride sharing service would select an available vehicle, which could be from a pool of company vehicles or a privately-owned vehicle which is available for rent. The ride sharing service would then download the access information to the available vehicle (now the vehicle 10) and to the customer's smart phone (now the device 14). The customer can then use the device 14 to gain access to and operate the vehicle 10, with any restrictions placed on it, as discussed above.

Vehicle personalization is also possible when using the device 14 for vehicle access and mobilization. Personalization settings, such as seat and pedal positions, HVAC and radio preferences, performance settings, and others, can be made available by the device 14 and used by the vehicle 10. These personalization settings can be provided by any type of the device 14 used in the vehicle 10—whether the device 14 belongs to a master or owner, a regular guest such as a child, or a one-time guest such as a ride sharer.

Event-based information capture is another feature which can be used in conjunction with the continuous time communications capability described above, or used without it. In event-based information capture, a driver can use an NFC-equipped smart phone or other device to capture information from in-vehicle display events, and gather additional information or take certain actions based on the information captured. Examples range from automatically identifying and buying a song which is currently playing on a radio station, to getting detailed information related to a "check engine" message which was displayed.

Figure 3:
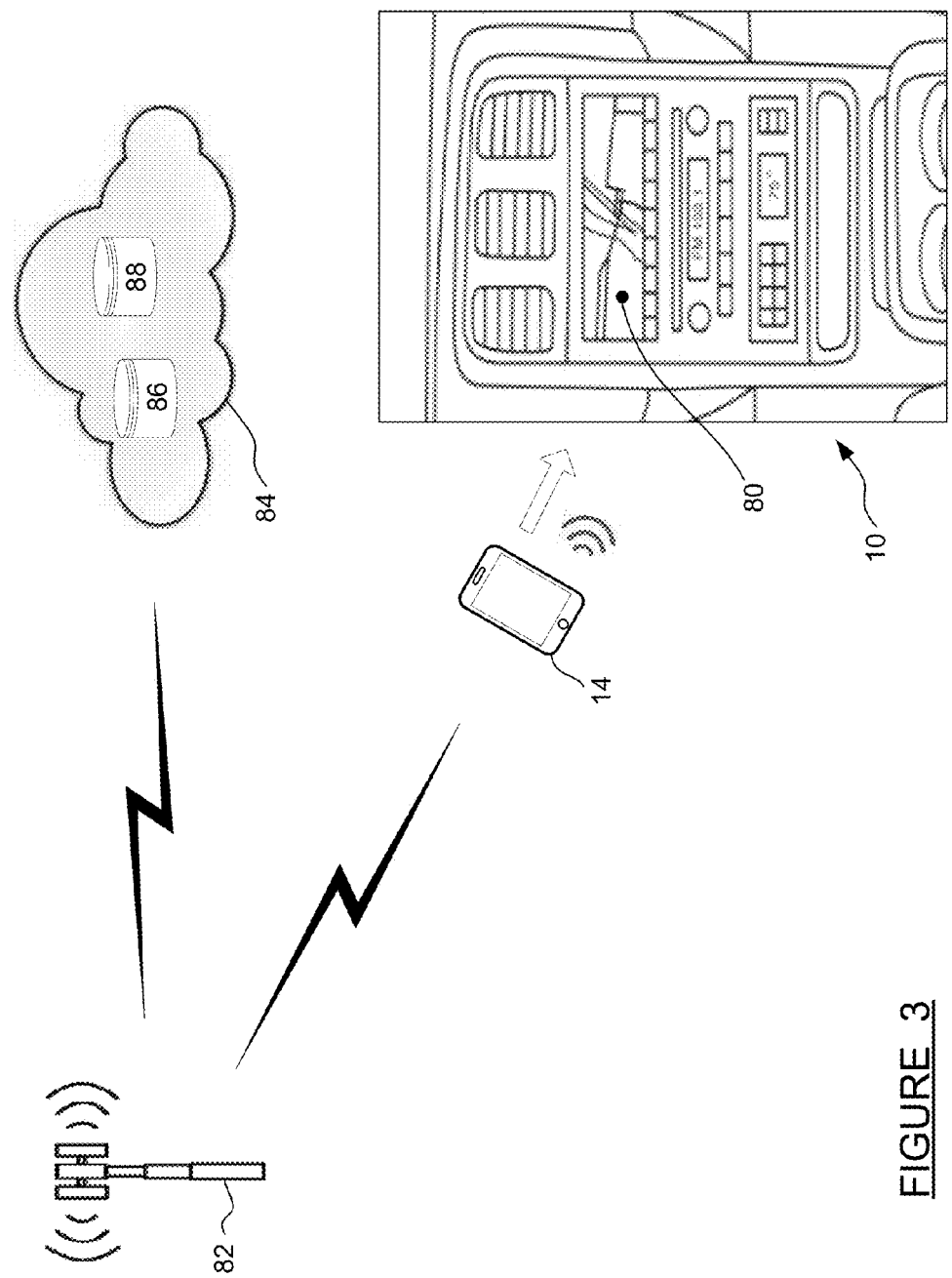
FIG. 3 is an illustration of the communications which take place when NFC is used to enable event-based information capture by the mobile device in the vehicle.

FIG. 3 is an illustration of the communications which take place when NFC is used to enable event-based information capture by the mobile device 14 in the vehicle 10. When information of interest is displayed anywhere on the console or dashboard area of the vehicle 10, the driver taps or waves the mobile device 14 at a spot 80 where the information is being displayed. There can be several of the spots 80 in the vehicle 10, which could be in the navigation or map display (e.g., NFC antennas mounted behind the glass or reflective surface of the display), in the radio display, in a vehicle diagnostic display, and/or elsewhere—including non-dynamic display areas (areas that have printed text, graphics or are back-lit) such as vehicle knobs, switches or handles. For example, a back-lit LED may be used as a cue to inform the driver where to tap the phone. Such a cue could use color or a specific flashing rate to gather the driver's attention. Each of the spots 80 in the different display locations of the vehicle 10 is equipped with an NFC tag or transponder which detects the tap of the device 14 and responds by transferring the relevant information. In one embodiment, the spots 80 each include an NFC tag which simply identifies the location which was tapped (such as "radio") and the application 22 on the device 14 requests current information for the location (such as the name of the song being played on the radio) from the vehicle 10 via Bluetooth or Wi-Fi. In another embodiment, the spots 80 each include an NFC chip or transponder which directly provides the relevant information when the device 14 is brought within NFC range.

In either of the embodiments described above, the device 14 receives a small amount of information of interest—such as a name of a song on the radio, a diagnostic trouble code (DTC) indicator associated with a warning message, or a name of a point of interest displayed on a map. The application 22 on the device 14 takes context-specific action based on the type of information which is captured. In most cases, the device 14 will need to gather additional details associated with the captured information. The application 22 causes the device 14 to communicate via its cellular carrier 82 to the internet 84 or other cloud-based data sources. Examples of data sources accessed by the device 14 include a vehicle manufacturer's DTC/service database 86 and a satellite radio service database 88. The application 22 displays the originally captured information and the additional details to the driver, along with optional actions which may be taken by the driver. Several examples are discussed below.

Figure 4:
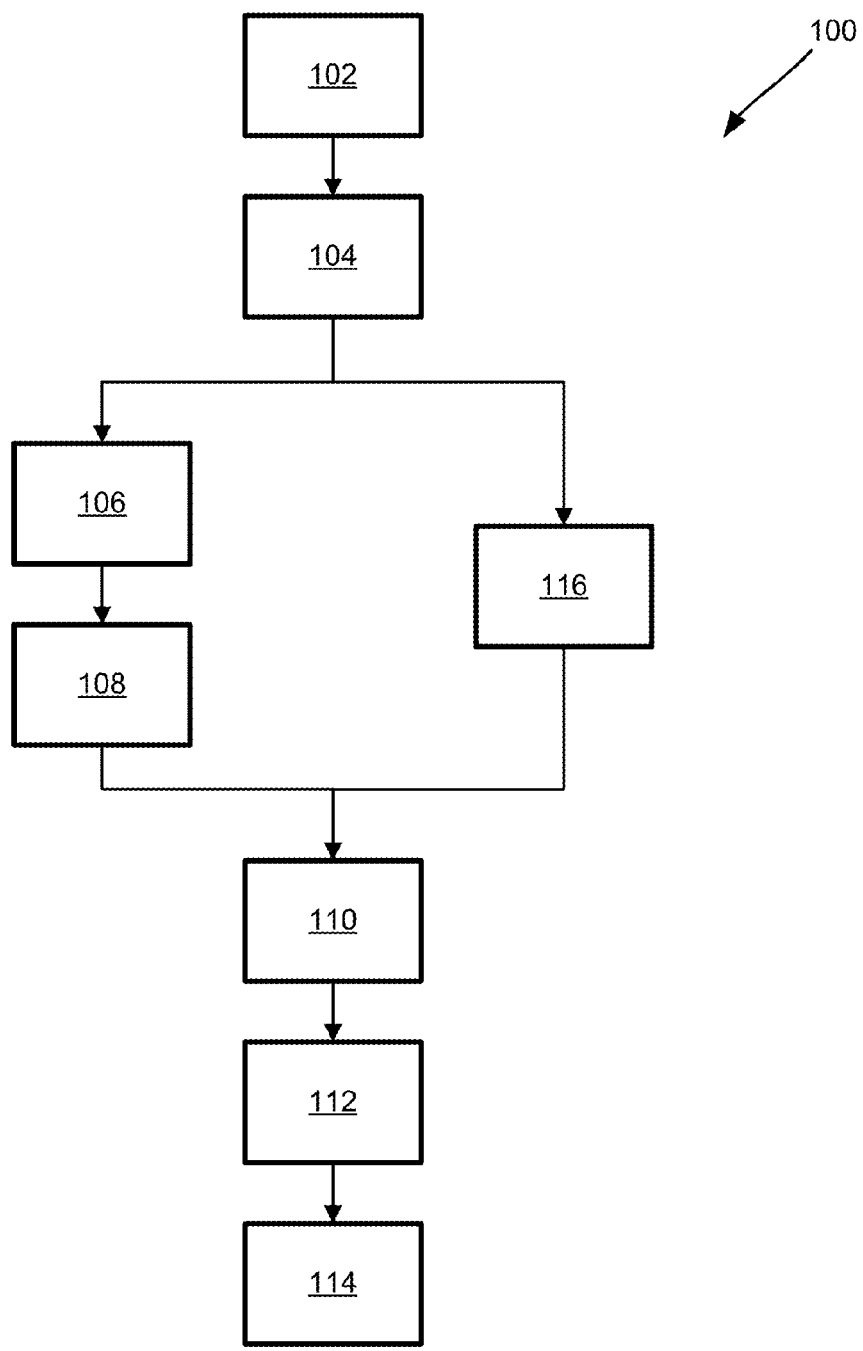
FIG. 4 is a flowchart diagram of a method for performing event-based information capture using the mobile device in the vehicle.

FIG. 4 is a flowchart diagram 100 of a method for performing event-based information capture using the mobile device 14 in the vehicle 10. At box 102, information is displayed on a display unit in the vehicle 10. At box 104, if interested in acting on the information displayed, the driver waves the device 14 at the spot 80 associated with the displayed information. At box 106, for the embodiment where the spot 80 is equipped with an NFC tag, the tag provides its identification information to the device 14. At box 108, the device 14 requests and receives from the vehicle 10 the appropriate information relating to the displayed event. The application 22 on the device 14 can automate the tasks at the box 108, where the device 14 initiates Wi-Fi or Bluetooth communications with the vehicle 10 if such communications are not already active, the device 14 sends the information request for the event associated with the identified spot 80, and the device 14 receives the information from the vehicle 10.

At box 110, the device 14 uses its cellular carrier 82 to request and receive additional details related to the information captured from the vehicle 10. The request for detail is typically directed to an internet- or cloud-based data source, such as a search engine, an auto manufacturer or a satellite radio service. At box 112, the device 14 displays the detailed data which it received at the box 110, along with the information originally captured from the vehicle 10. At box 114, the driver uses the device 14 to perform additional actions based on the detailed data provided.

At box 116, for the embodiment where the spot 80 is equipped with an NFC transponder, the transponder provides the information relating to the displayed event directly to the device 14 via NFC. In this case, there is no need for a separate Wi-Fi or Bluetooth communications channel. At the box 110, the device 14 then proceeds to use its cellular service to request and receive additional details related to the information captured from the vehicle 10.

Many different use-case scenarios are possible for event-based information capture. When used with the vehicle infotainment system, captured information can include a title and/or artist of a song currently being played. The device 14 can then retrieve additional information about the song and/or artist, such as the album on which the song appears, song lyrics, other works by the artist, etc. Follow-up actions offered by the device 14 include buying the song MP3 file, buying the whole album, buying tickets for a concert by the artist, etc. Advertising information could also be provided by a satellite radio or digital radio service provider when a commercial is aired. From the vehicle navigation system, information about points of interest—both commercial and public—can be provided. Point of interest actions could include calling a restaurant to make reservations, or learning the hours of operation of a museum. Integration between the vehicle's phone and the device 14 can also be provided, such as capturing contact information on the device 14 from an incoming call on the vehicle's phone, or transferring a call from the vehicle's phone to the mobile device 14.

The information capture feature would also be a convenient way for a customer to purchase a satellite radio service subscription. The customer could tap the device 14 at the spot 80 in the radio to capture the satellite radio identifier from the NFC tag in the radio. From the device 14, the customer could then purchase the service from the satellite radio service provider, who could then send an activation request via the telematics service provider to the vehicle 10, which would then activate the satellite radio service subscription.

When used with the vehicle diagnostic system, tell-tale messages (warnings or notices about the status of a system) can be captured, and additional detail can be obtained from the vehicle manufacturer. For example, a dashboard display may simply provide a "Check Engine" message, but one or more specific DTCs may be recorded by an engine controller. The device 14 can capture the DTC information and retrieve additional detail about it, and provide the details—what the problem is, and how severe it is—to the driver. As a follow-up action, the device 14 could schedule an appointment for vehicle service, including transferring the DTC data to the service facility via the telematics system.

The event-based information capture feature described above offers great utility to the drive—providing detailed information and follow-up action options related to many different data items which could be displayed in the vehicle 10, and doing so when the driver simply waves or taps the mobile device 14 at the data item of interest.

Other methods of NFC-based interaction between the mobile device 14 and the vehicle 10 are also possible. One broad category of device-vehicle interaction using NFC may be referred to as gesture-based control. In gesture-based control, motion of the NFC-enabled device 14 is detected by one or more NFC tags or readers in the vehicle 10, and the motion is used to infer a control command for a device or feature. For example, moving the device 14 in an upward motion adjacent to a window could be interpreted to mean "close this window".

Figure 5:
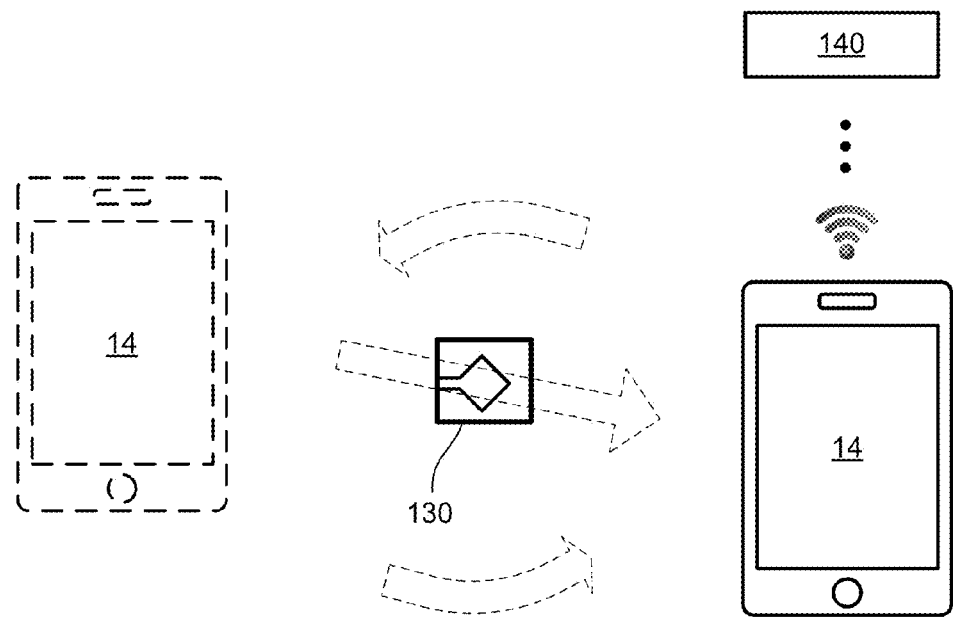
FIG. 5 is an illustration of a first embodiment of gesture-based control of a vehicle feature, using the mobile device in conjunction with an NFC tag and Wi-Fi or Bluetooth communications.

Gesture-based control can be implemented in several ways, as depicted in FIGS. 5-8. FIG. 5 is an illustration of a first embodiment of gesture-based control of a vehicle feature, using the mobile device 14 in conjunction with an NFC tag and Wi-Fi or Bluetooth communications. An NFC tag 130 is placed in the vehicle 10 at a location where the tag 130 is representative of a particular vehicle feature. For example, the NFC tag 130 could be placed in a door of the vehicle 10 where it represents a window opening/closing control. The NFC tag 130 does not communicate with other vehicle systems—it is a standalone tag which includes data identifying it as a window control tag. When the device 14 is passed over the tag 130, the device 14 reads the data from the tag 130 and determines that the driver wishes to invoke a window control. The device 14 then uses its own motion detection sensors, such as gyroscopic sensors and accelerometers, to determine the type of motion that the device 14 was experiencing when it was passed over the tag 130. For example, an upward motion would mean "close this window". The device 14 communicates the functional command to a controller 140 in the vehicle 10 using another wireless communications technology, such as Bluetooth or Wi-Fi.

In the first embodiment of gesture-based control shown in FIG. 5, many of the NFC tags 130 could be placed in the vehicle 10, one for each different system or feature. For example, one of the NFC tags 130 could be placed in the driver's door or door pillar for window control, one in the driver's door handle for door lock control, one adjacent to the driver's seat for seat position control, etc. Both translational and rotational control commands can be provided by the device 14, as most smart phones include sensors capable of measuring both types of motion. Rotational control commands could be used to control outside rear-view mirrors, for example.

Figure 6:
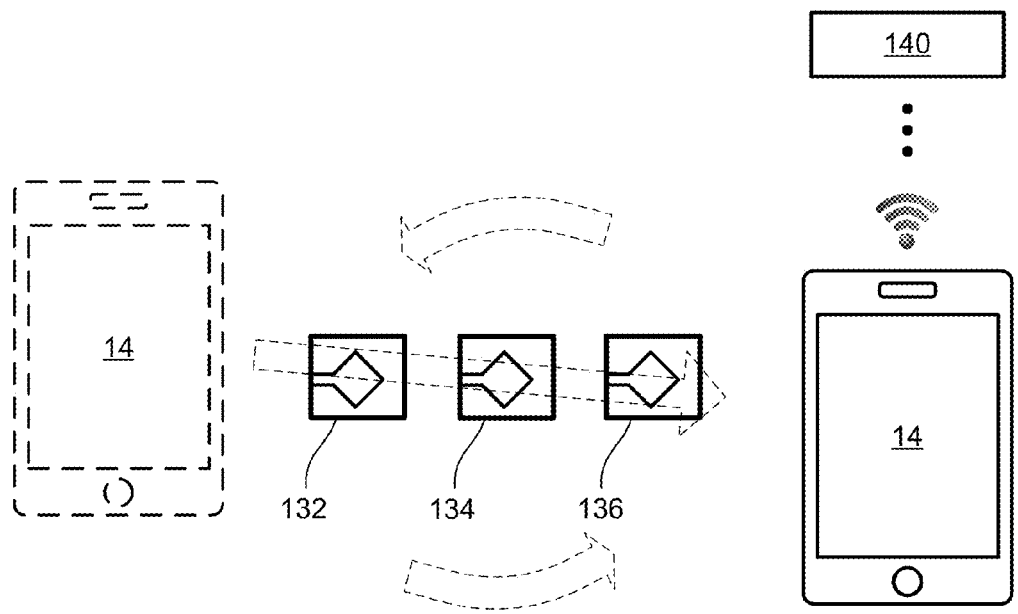
FIG. 6 is an illustration of a second embodiment of gesture-based control of a vehicle feature, using the mobile device in conjunction with multiple NFC tags and Wi-Fi or Bluetooth communications.

FIG. 6 is an illustration of a second embodiment of gesture-based control of a vehicle feature, using the mobile device 14 in conjunction with multiple (two or more) NFC tags and Wi-Fi or Bluetooth communications. In the second embodiment, NFC tags 132, 134 and 136 are placed in close proximity of one another, and are collectively used to represent one vehicle feature, such as a door lock. As in the first embodiment, the NFC tags 132-136 are standalone tags containing a small amount of identification data, but not connected to other vehicle systems. When the device 14 is passed over the tags 132, 134 and 136, the device 14 reads the data from each tag in succession. From this, the device 14 determines not only what vehicle feature is to be controlled, but also what the direction of control is. For example, if the device 14 encounters the NFC tags 132-134-136 in that order, the device 14 knows that the driver wishes to lock the doors. If the device 14 encounters the NFC tags 136-134-132 in that order, the device 14 knows that the driver wishes to unlock the doors. As in the first embodiment, the device 14 communicates the actual functional command to the controller 140 in the vehicle 10 using another wireless communications technology, such as Bluetooth or Wi-Fi. Tag layouts may be defined in a linear, grid or an arbitrary shape. Given a sufficient number of tags, this would enable a variety of complex input gestures to be derived from device movement across and around the defined pattern.

Figure 7:
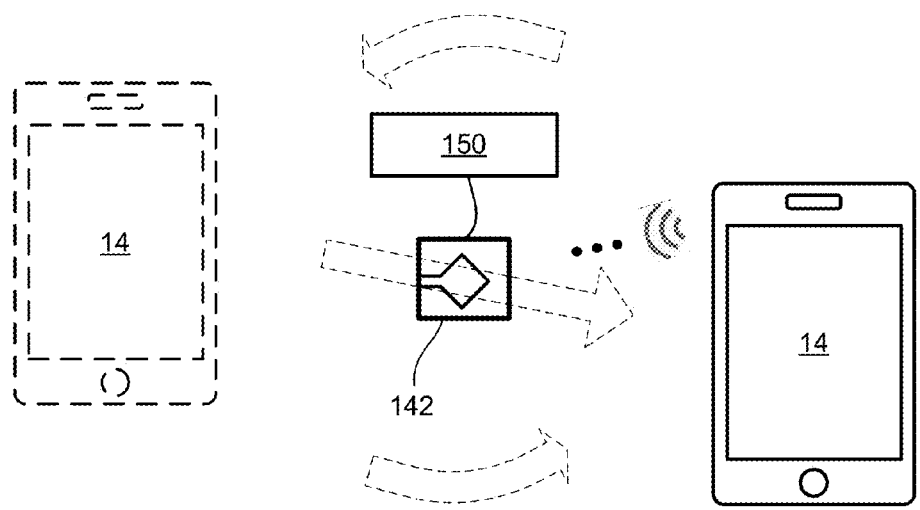
FIG. 7 is an illustration of a third embodiment of gesture-based control of a vehicle feature, using the mobile device in conjunction with a vehicle-integrated NFC reader.

FIG. 7 is an illustration of a third embodiment of gesture-based control of a vehicle feature, using the mobile device 14 in conjunction with a vehicle-integrated NFC chip. An NFC chip 142 communicates with a controller 150. The NFC chip 142 is placed in a location appropriate for the system or feature which it represents, such as a window control. When the mobile device 14 is passed over the NFC chip 142, the chip 142 detects an NFC signal from the device 14 and communicates to the controller 150 that a window control is forthcoming. At the same time, the device 14 determines that it has passed over the NFC chip 142, and ascertains that the chip 142 represents a window control. The device 14 uses its own sensors to determine its motion profile, and sends its motion or gesture profile parameters to the chip 142 via NFC. For example, an upward motion indicates that the window is to be closed. The NFC chip 142 passes the window control command along to the controller 150, which executes the command. In this case, no Bluetooth or Wi-Fi communications are used.

Figure 8:
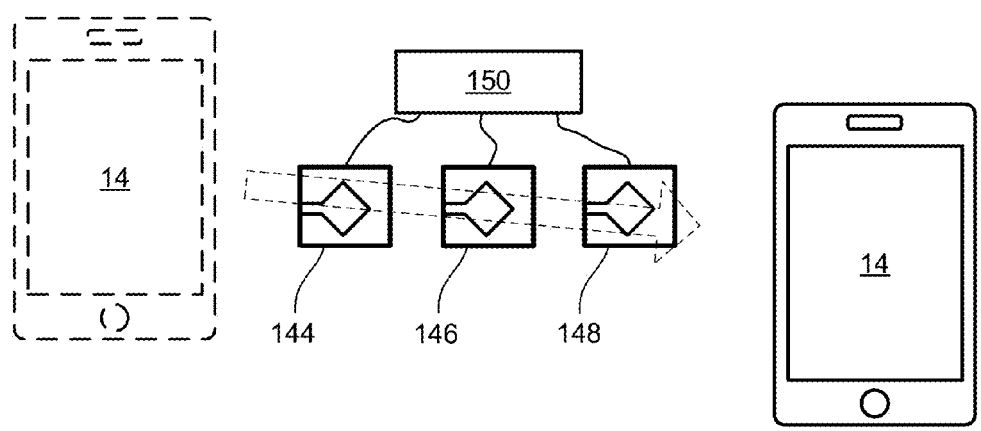
FIG. 8 is an illustration of a fourth embodiment of gesture-based control of a vehicle feature, using the mobile device in conjunction with multiple vehicle-integrated NFC readers.

FIG. 8 is an illustration of a fourth embodiment of gesture-based control of a vehicle feature, using the mobile device 14 in conjunction with multiple vehicle-integrated NFC chips. In this embodiment, NFC chips 144, 146 and 148 communicate with the controller 150. When the device 14 passes over the chips 144-148, each of the chips 144-148 sends a signal to the controller 150 indicating it has been contacted by the device 14. The sequence of the signals from the chips 144-148 indicates not only the system being controlled but also the direction of the control. For example, if the device 14 encounters the NFC chips 144-146-148 in that order, the controller 150 knows that the driver wishes to lock the doors. If the device 14 encounters the NFC chips 148-146-144 in that order, the controller 150 knows that the driver wishes to unlock the doors. In this embodiment, the controller 150 receives all of the information it needs from the NFC chips 144-148. The device 14 does not need to transmit any motion information in this embodiment; the command gesture is detected by the chips 144-148 and the command is interpreted by the controller 150.

By extending the inherently secure NFC technology to include continuous time communications sessions, while integrating device charging and other features, the methods disclosed herein provide many features to the vehicle driver in a secure and convenient package. At the same time, these methods allow the vehicle manufacturer to offer advanced features, while reducing cost and improving reliability via a reduction in the number of physical switches and controls.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for providing continuous time communications between a mobile device and a vehicle using Near Field Communications (NFC), said system comprising:
    an interface module in the vehicle, including an NFC chip and a charging pad, where the interface module wirelessly charges the mobile device when the mobile device is placed on the interface module, and where the interface module is configured to manage continuous, two-way NFC communications between the mobile device and the vehicle by detecting the presence of the mobile device within NFC range of the interface module, determining if the mobile device is authorized to communicate with the vehicle, verifying that the mobile device is still in close proximity to the interface module by performing a Packet Delivery Ratio (PDR) test, and determining that the mobile device is capable of interoperation with the vehicle by issuing a performance challenge including a computing task to be completed by the mobile device, and the computing task is varied randomly as the performance challenge is periodically repeated; and
    at least one vehicle feature which is controllable by the mobile device via the interface module.

2. The system of claim 1 wherein the interface module determines if the mobile device is authorized to communicate with the vehicle by receiving credential information from an application program on the mobile device.

3. The system of claim 1 wherein the performance challenge further includes a communications task to be completed by the mobile device.

4. The system of claim 1 wherein the interface module provides mobile device access to the vehicle feature if both the PDR test and the performance challenge are passed.

5. The system of claim 1 wherein the vehicle feature is a warning-type feature, where an application program on the mobile device provides informational messages and warnings on a display in the vehicle.

6. The system of claim 1 wherein the vehicle feature is a control-type feature, where an application program on the mobile device autonomously controls vehicle systems in real time.

7. A method for providing a continuous time communications session between a mobile device and a vehicle using Near Field Communications (NFC), said method comprising:
    placing the mobile device in close proximity to an interface module in the vehicle, where both the mobile device and the interface module include an NFC chip, the interface module includes a wireless charging pad, and the mobile device is wirelessly charged when the mobile device is placed on the charging pad;
    detecting the presence of the mobile device by the interface module, where detecting the presence uses NFC signals;
    determining by the interface module if the mobile device is authorized to communicate with the vehicle, including an application program on the mobile device providing credentials to the interface module;
    establishing two-way NFC communications between the mobile device and the vehicle;
    verifying that the mobile device is still in close proximity to the interface module by performing a Packet Delivery Ratio (PDR) test;
    determining that the mobile device is capable of interoperation with the vehicle by issuing a performance challenge, including a computing task or a communications task; and
    providing mobile device access to vehicle services via continuous two-way NFC communications if both the PDR test and the performance challenge are passed, including providing access to control-type vehicle services, where an application program on the mobile device autonomously controls vehicle systems in real time, if a second, more stringent, performance challenge is passed.

8. A method for providing a continuous time communications session between a mobile device and a vehicle using Near Field Communications (NFC), said method comprising:

placing the mobile device in close proximity to an interface module in the vehicle, where both the mobile device and the interface module include an NFC chip, the interface module includes a wireless charging pad, and the mobile device is wirelessly charged when the mobile device is placed on the charging pad;

detecting the presence of the mobile device by the interface module, where detecting the presence uses NFC signals;

determining by the interface module if the mobile device is authorized to communicate with the vehicle;

establishing two-way NFC communications between the mobile device and the vehicle;

verifying that the mobile device is still in close proximity to the interface module by performing a Packet Delivery Ratio (PDR) test;

determining that the mobile device is capable of interoperation with the vehicle by issuing a performance challenge, where the performance challenge includes a computing task to be completed by the mobile device, and the computing task is varied randomly as the performance challenge is periodically repeated; and providing mobile device access to vehicle services via continuous two-way NFC communications if both the PDR test and the performance challenge are passed.

9. The method of claim 1 wherein determining if the mobile device is authorized to communicate with the vehicle includes providing credentials by an application program on the mobile device.

10. The method of claim 1 wherein determining that the mobile device is capable of interoperation with the vehicle by issuing a performance challenge includes a communications task, to be completed by the mobile device, in the performance challenge.

11. The method of claim 1 wherein providing mobile device access to vehicle services includes providing access to warning-type vehicle services, where an application program on the mobile device provides informational messages and warnings for display by the vehicle.

12. The method of claim 1 wherein providing mobile device access to vehicle services includes providing access to control-type vehicle services, where an application program on the mobile device controls vehicle systems.

13. The method of claim 11 wherein the vehicle systems include audio and video systems, a navigation system and HVAC controls.

14. The method of claim 13 further comprising using the application program to provide control of the vehicle systems via voice commands given by a driver or passenger to the mobile device.

15. The method of claim 11 further comprising using the application program to autonomously control vehicle systems in real time, including throttle, braking and steering systems.

16. The method of claim 1 wherein providing mobile device access to vehicle services includes providing vehicle mobilization and immobilization control.

17. The method of claim 16 wherein vehicle mobilization and immobilization control includes geo-fencing and limitations on vehicle speed and performance.

18. The method of claim 1 further comprising capturing event-based information, where the mobile device is moved within NFC communications range of an information display in the interior of the vehicle and additional details about the information being displayed are automatically downloaded to the mobile device.

* * * * *